United States Patent
Riggsby

(10) Patent No.: US 9,780,831 B2
(45) Date of Patent: Oct. 3, 2017

(54) LOW DISTORTION SIGNAL AMPLIFIERS HAVING EXTENDED UPSTREAM BANDWIDTHS AND RELATED METHODS

(75) Inventor: Robert Ryan Riggsby, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 13/531,613

(22) Filed: Jun. 25, 2012

(65) Prior Publication Data

US 2013/0347049 A1    Dec. 26, 2013

(51) Int. Cl.
  *H04N 21/61* (2011.01)
  *H04N 21/226* (2011.01)
  *H04N 21/426* (2011.01)
  *H04B 3/38* (2006.01)
  *H04N 7/10* (2006.01)

(52) U.S. Cl.
  CPC .............. *H04B 3/38* (2013.01); *H04N 7/102* (2013.01)

(58) Field of Classification Search
  CPC ..... H04N 21/226; H04N 21/426; H04N 21/61
  See application file for complete search history.

(56) References Cited

U.S. PATENT DOCUMENTS

| | | | |
|---|---|---|---|
| 5,101,171 A | 3/1992 | Redmond | |
| 5,898,454 A | 4/1999 | Brickell | |
| 7,359,332 B2 * | 4/2008 | Kolze et al. | 370/252 |
| 7,616,890 B2 | 11/2009 | Orbach et al. | |
| 8,244,194 B2 * | 8/2012 | Morgan et al. | 455/188.1 |
| 2007/0022460 A1 * | 1/2007 | Kim et al. | 725/128 |
| 2008/0216144 A1 * | 9/2008 | Weinstein et al. | 725/127 |
| 2009/0119735 A1 * | 5/2009 | Dounaevski et al. | 725/129 |
| 2010/0100918 A1 | 4/2010 | Egan, Jr. et al. | |
| 2010/0162340 A1 * | 6/2010 | Riggsby | 725/127 |
| 2010/0251320 A1 | 9/2010 | Shafer et al. | |
| 2011/0185263 A1 * | 7/2011 | Chapman et al. | 714/776 |
| 2011/0255452 A1 * | 10/2011 | Brooks | 370/297 |

\* cited by examiner

*Primary Examiner* — Nasser Goodarzi
*Assistant Examiner* — Adil Ocak
(74) *Attorney, Agent, or Firm* — Muncy, Geissler, Olds & Lowe, P.C.

(57) ABSTRACT

Radio frequency ("RF") signal amplifiers include an RF input, at least one RF output and communications paths therebetween. The communications paths include a downstream path that is configured to pass signals in a downstream frequency band, a first upstream path that is configured to pass signals in a first upstream frequency band that encompasses frequencies that are lower than the frequencies included within the downstream frequency band and a second upstream path that is configured to pass signals in a second upstream frequency band that encompasses frequencies that are between the frequencies included within the downstream frequency band and the frequencies included within the first upstream frequency band. These RF signal amplifiers further include a downstream power amplifier on the downstream path, a first upstream power amplifier on the first upstream path and a second upstream power amplifier on the second upstream path.

17 Claims, 3 Drawing Sheets

LOW DISTORTION SIGNAL AMPLIFIERS HAVING EXTENDED UPSTREAM BANDWIDTHS AND RELATED METHODS

FIELD OF THE INVENTION

The present invention is directed to cable television networks and, more particularly, to signal amplifiers that are suitable for use in cable television networks.

BACKGROUND

Cable television networks refer to communications networks that are used to transmit cable television signals and/or other information between one or more service providers and a plurality of subscribers, typically over coaxial and/or fiber optic cables. Most conventional cable television networks comprise hybrid fiber-coaxial networks. In these networks, fiber optic cables are typically used to carry signals from the headend facilities of the service provider to various distribution points, while coaxial cable may be used, for example, to carry the signals into neighborhoods and/or into individual homes, apartment complexes, businesses, hotels, condominiums, schools, government facilities and other subscriber premises.

Typically, the service provider is a cable television company that may have exclusive rights to offer cable television services in a particular geographic area. The service provider may broadcast a broad variety of cable television channels to subscribers over the cable television network. Most cable television service providers also offer other services such as, for example, broadband Internet service and digital telephone service. Thus, in many cases, a subscriber may receive cable television service, a broadband Internet connection, and Voice-over-Internet Protocol ("VoIP") telephone service all through a single RF connection between the service provider and the subscriber premise. The cable television network may transmit both "downstream" signals (which are also sometimes referred to as "forward path" signals) from the headend facilities to the subscriber premises and "upstream" signals (which are also sometimes referred to as "reverse path") from the individual subscriber premises back to the headend facilities. Typically, the downstream signals are transmitted in the 54-1002 MHz frequency band, and may include, for example, the different tiers of cable television channels, movies on demand, digital telephone and/or Internet service (the signals received by the subscriber), and other broadcast or point-to-point offerings. Typically, the upstream signals are transmitted in the 5-42 MHz frequency band and may include, for example, signals associated with digital telephone and/or Internet service (the signals transmitted by the subscriber) and ordering commands (i.e., for movies-on-demand and other services).

In many cases, significant attenuation may occur as signals are passed through the cable television network, and hence the power level of the RF signal that is received at subscriber premises may be on the order of 0-5 dBmV/channel, which may be insufficient to support the various services at an acceptable quality of service level. Accordingly, RF signal amplifiers may be provided at or near individual subscriber premises that are used to amplify the downstream RF signals received over the RF connections between the cable television network and the subscriber premises to a more useful level. These RF signals amplifier may also be configured to amplify the upstream RF signals that are transmitted from the subscriber premise to the cable television network.

SUMMARY

Pursuant to embodiments of the present invention, RF signal amplifiers are provided that include an RF input, at least one RF output and communications paths therebetween. The communications paths include a downstream path that is configured to pass signals in a downstream frequency band, a first upstream path that is configured to pass signals in a first upstream frequency band that encompasses frequencies that are lower than the frequencies included within the downstream frequency band and a second upstream path that is configured to pass signals in a second upstream frequency band that encompasses frequencies that are between the frequencies included within the downstream frequency band and the frequencies included within the first upstream frequency band. These RF signal amplifiers further include a downstream power amplifier on the downstream path, a first upstream power amplifier on the first upstream path and a second upstream power amplifier on the second upstream path.

In some embodiments, the RF signal amplifier further includes a first triplexer that has an input port that is coupled to the RF input, a first output port that is coupled to an input of the downstream power amplifier, a second output port that is coupled to an output of the first upstream power amplifier, and a third output port that is coupled to an output of the second upstream power amplifier. The RF signal amplifier may also include a second triplexer that has a first input port that is coupled to an output of the downstream power amplifier, a second input port that is coupled to an input of the first upstream power amplifier, a third input port that is coupled to an input of the second upstream power amplifier and an output port that is coupled to the at least one RF output. In some embodiments, the first and second upstream power amplifiers may be substantially identical to each other and/or may each have an operating range that extends across the entire the first upstream frequency band and the entire second upstream frequency band.

Pursuant to still further embodiments of the present invention, RF signal amplifiers are provided that include an RF input that is coupled to a cable television network and at least one RF output. These RF signal amplifiers include a downstream communications path that is coupled between the RF input and the at least one RF output, the downstream communications path being configured to pass signals in a downstream frequency band and an upstream communications path that is coupled between the RF input and the at least one RF output the upstream communications path being configured to pass selected signals in an upstream frequency band that encompasses frequencies that are lower than the frequencies included within the downstream frequency band. The upstream communications path includes a first upstream path that is configured to pass upstream signals within a first upstream frequency band and a second upstream path that is configured to pass upstream signals within a second upstream frequency band and a guard band that is configured to limit upstream signals from passing that are at frequencies that are between the first upstream frequency band and the second upstream frequency band.

In some embodiments, the RF signal amplifier further includes a downstream power amplifier that is configured to amplify signals traversing the downstream communications path, a first upstream power amplifier that is configured to amplify signals traversing the first upstream path and a second upstream power amplifier that is configured to amplify signals traversing the second upstream path. These RF signal amplifiers may also include a first triplexer that has an input port that is coupled to the RF input, a first output port that is coupled to an input of the downstream power amplifier, a second output port that is coupled to an output of the first upstream power amplifier, and a third output port that is coupled to an output of the second upstream power amplifier. These RF signal amplifiers may also include a second triplexer that has a first input port that is coupled to an output of the downstream power amplifier, a second input port that is coupled to an input of the first upstream power amplifier, a third input port that is coupled to an input of the second upstream power amplifier and an output port that is coupled to the at least one RF output. The first and second upstream power amplifiers may be substantially identical to each other. Moreover, an operating bandwidth of the first and/or second upstream power amplifiers may extend across both the first upstream frequency band and the second upstream frequency band.

Pursuant to further embodiments of the present invention, methods of transmitting signals from a subscriber premise to a cable television network via a radio frequency ("RF") signal amplifier are provided in which a first upstream signal is coupled to a first upstream communications path of the RF signal amplifier based on a center frequency of the first upstream signal. This first upstream signal is amplified using a first upstream power amplifier. A second upstream signal is coupled to a second upstream communications path of the RF signal amplifier based on a center frequency of the second upstream signal. This second upstream signal is amplified using a second upstream power amplifier. The first and second upstream signals are then combined into a composite upstream signal and this composite upstream signal is coupled from the RF signal amplifier to the cable television network.

In some embodiments, the first upstream signal may have a first modulation format and the second upstream signal may have a second modulation format that is different from the first modulation format. Moreover, these methods may further include routing all upstream signals having the first modulation format through the first upstream communications path and routing all upstream signals having the second modulation format through the second upstream communications path.

DETAILED DESCRIPTION

Figure 1:
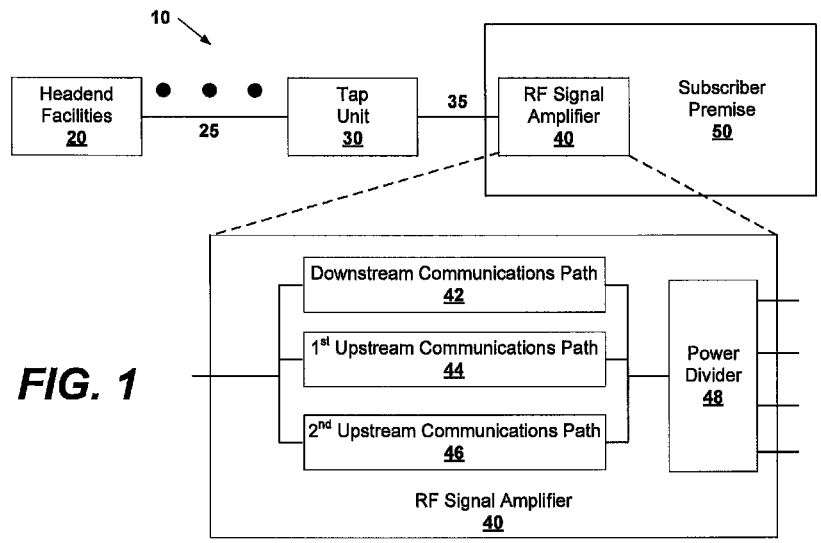
FIG. 1 is a greatly simplified, schematic block diagram of a cable television network that includes an RF signal amplifier according to certain embodiments of the present invention.

Pursuant to embodiments of the present invention, RF signal amplifiers are provided that may be suitable for use in a cable television network. These RF signal amplifiers may be disposed, for example, within or near a subscriber premise. The RF signal amplifiers according to embodiments of the present invention may have an extended upstream frequency band for the upstream communications path that is significantly larger than the 5-42 MHz frequency band that has traditionally been used in the United States for carrying upstream signals from a subscriber premise to the headend facilities of a cable television network. By way of example, in some embodiments, the extended upstream frequency band may include frequencies in the 5-85 MHz frequency range. This increased upstream bandwidth may be desirable as devices in various subscriber premises start to act more like servers and/or distribute their own content as occurs, for example, when subscribers upload pictures, videos, web pages and the like to the Internet for viewing or delivery to others.

As noted above, it is typically desirable to amplify the upstream signals using an RF signal amplifier located at or near the subscriber premise to ensure that the upstream signals that are received at the headend facilities have an acceptable signal-to-noise ratio. However, the power amplifiers that are typically used to perform this amplification are non-linear devices, and hence distortions such as, for example, second and third order harmonics are generated during the amplification process. If the bandwidth of the upstream communications path is increased by, for example, a factor of two, the resultant doubling of the number of channels included within this extended bandwidth may increase channel power by 3 dB. The discrete second order harmonics will increase with increasing channel power level on a one-to-one basis, thus worsening by a factor of two (3 dB), and the discrete third order harmonics will increase on a two-to-one basis with increasing channel power, thus worsening by a factor of four (6 dB). Moreover, by extending the bandwidth by a factor of two, more of the second and third order harmonics will fall within the bandwidth of the upstream communications path, where such harmonics appear as interference (noise). Consequently, if a conventional upstream power amplifier is used to amplify the upstream signals that are being carried on the above-described extended bandwidth upstream communications path, the power amplifier must be run at an output power level that is less than half (3 dB below) the output power at which the power amplifier is run when used on a conventional 5-42 MHz upstream communications path if one wants to prevent any increase in signal distortion. However, such a reduction in the output power level (which is achieved by reducing the input power to the power amplifier) results in a direct reduction of the signal level and the signal-to-noise level of the upstream signals, and this reduction in the quality and level of the upstream signals typically cannot be corrected farther upstream in the cable television network. Consequently, if the upstream bandwidth is increased, it may become more difficult to provide low distortion amplification coupled with high a signal-to-noise ratio at the output of the power amplifier. In fact, in some cases, the reduction in signal level/quality may prevent recovery of the signal at the headend facilities.

One potential way to address the above-identified problem is to use power amplifiers that exhibit improved linearity over the frequency band of interest. Unfortunately, however, such higher performance power amplifiers may be more expensive than the upstream power amplifiers that are commonly used today. Moreover, if a single amplifier is used, it would typically be necessary to double the input power to the amplifier (since the power is being spread across a frequency band that is twice as large). This will typically result in increased heat from a point source which must be dissipated without degrading the performance of other components within the RF signal amplifier.

Pursuant to embodiments of the present invention, RF signal amplifiers are provided that may use two conventional upstream power amplifiers to provide an extended bandwidth upstream communications path. These RF signal amplifiers may exhibit upstream communications path channel performance that is virtually identical to the upstream communications path channel performance of conventional cable television network RF signal amplifiers, while providing twice the upstream bandwidth to better satisfy the increased upstream bandwidth requirements of many subscribers. In some embodiments, these RF signal amplifiers include an RF input, at least one RF output, and a downstream communications path that is coupled between the RF input and the RF output(s) that includes a downstream power amplifier that is configured to amplify signals traversing the downstream communications path. These RF signal amplifiers also include first and second upstream communications paths that are also coupled between the RF input port and the RF output(s). The first and second upstream communications paths are configured to pass signals within respective first and second upstream frequency bands that each encompass frequencies that are lower than the frequencies that are passed by the downstream communications path. The first and second upstream communications paths include respective first and second power amplifiers. In some embodiments, the RF signal amplifiers may include a first triplexer that is disposed between the RF input and the power amplifiers, and a second triplexer may be provided that is disposed between the RF output(s) and the power amplifiers.

In some embodiments, the RF signal amplifiers may be configured to carry signals having a first modulation format on the first upstream communications path and signals having a second modulation format on the second upstream communications path. For example, the cable television network may transmit DOCSIS signals on carrier frequencies that fall within the frequencies passed by the first upstream communications path, and may transmit E-PON Protocol Over Coaxial ("EPOC") signals on carrier frequencies that fall within the frequencies passed by the second upstream communications path. This may provide improved performance in cable television networks that transmit upstream signals having different modulation formats.

Exemplary embodiments of the present invention will now be described with reference to the figures.

FIG. 1 is a greatly simplified, schematic block diagram of a cable television network 10 that illustrates the communications path between the headend facilities 20 of the cable television network 10 and a subscriber premise 50.

As shown in FIG. 1, the headend facilities 20 of the cable television network 10 may be connected to a tap unit 30 by a communications link 25. Typically, the communications link 25 will include optical and/or coaxial communications lines that connect various trunk stations, district sections, feeder sections and drop section (none of which are shown in FIG. 1 for simplicity) to the tap unit 30. The tap unit 30 which, for example, may be connected to a coaxial cable communications line that runs down a residential street, includes a tap port that is connected by a coaxial cable 35 to an RF signal amplifier 40. The RF signal amplifier 40 may be an RF signal amplifier according to embodiments of the present invention. The RF signal amplifier 40 is typically located just outside or inside a subscriber premise 50 with which it is associated. The RF signal amplifier 40 has one or more output ports (four unnumbered output ports are illustrated in the example of FIG. 1). The individual coaxial cable connector ports (i.e., wall jacks and the like) within the subscriber premise 50 (not shown) may be connected to respective ones of the output ports on the RF signal amplifier 40 so that the cable television network 10 may provide service to each wall jack throughout the subscriber premises 50.

As shown by the enlarged call-out in FIG. 1, the RF signal amplifier 40 according to embodiments of the present invention may include a downstream communications path 42 that carries downstream signals that are received at an input of the RF signal amplifier 40 to some or all of the outputs of the RF signal amplifier. The RF signal amplifier 40 further includes first and second upstream communications paths 44, 46 that carry upstream signals from the subscriber premises 50 to the input of the RF signal amplifier 40 for transmission to the headend facilities 20. As shown in FIG. 1, a power divider network 48 may be provided that splits the output of the RF signal amplifier into multiple outputs so that the RF signal amplifier 40 may service multiple wall jacks in the subscriber premise 50. The power divider network 48 may comprise, for example, a layered network of splitters or directional couplers that divide and further divide received downstream signals into a desired number of signals, and that combine upstream signals that are received from one or more wall jacks into a composite upstream signal.

Figure 2:
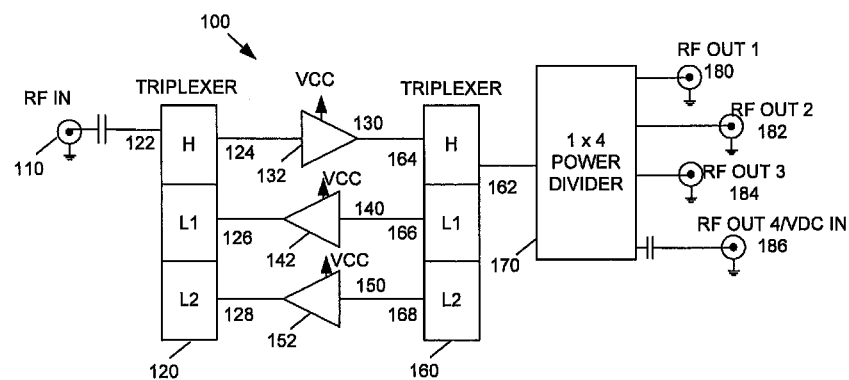
FIG. 2 is a block diagram of a bi-directional RF signal amplifier according to embodiments of the present invention.

FIG. 2 is a schematic block diagram of an RF signal amplifier 100 according to further embodiments of the present invention. As shown in FIG. 2, the RF signal amplifier 100 includes a bi-directional RF input port 110 for receiving downstream RF signals from a cable television network 10 (see FIG. 1) and for passing upstream RF signals from the RF signal amplifier 100 to the cable television network 10. The RF signal amplifier 100 may have an extended upstream communications bandwidth (e.g., the upstream communications path may operate in the 5-85 MHz frequency band), and may have a slightly reduced downstream communications path bandwidth (e.g., the downstream communications path may operate in the 105-1002 MHz frequency band).

RF signal amplifier 100 further includes a plurality of bi-directional RF output ports 180, 182, 184 and 186 that may be used to pass RF signals from the RF signal amplifier 100 to one or more devices that are located, for example, in the subscriber premise 50 (see FIG. 1), and to pass signals from such devices to the RF signal amplifier 100. It will be appreciated that any appropriate device that may send and/or receive an RF signal may be placed in communication with one or more of the various output ports 180, 182, 184, 186 of the RF signal amplifier 100. For example, devices such as Internet telephones, cable television sets, cable modems and/or other data communication devices may be connected to the RF signal amplifier 100 via the various output ports 180, 182, 184 and/or 186 when the RF signal amplifier 100 is installed in or outside a particular subscriber premise 50.

As shown in FIG. 2, the RF signal amplifier 100 further includes a triplexer 120 that is coupled to the RF input port 110. The triplexer 120 includes one "network-side" port 122 and three "subscriber-side ports 124, 126, 128 (herein a "network-side" port refers to a port of the triplexer that is on the cable television network side of the communications path through the triplexer, and a "subscriber-side" port refers to a port of the triplexer that is on the subscriber premise side of the communications path through the triplexer). RF signals that are received through input port 110 are passed to the network-side port 122 of triplexer 120. The triplexer 120 is configured to filter signals that are received from the RF input port 110 at network-side port 122 so that downstream signals (e.g., signals within the 105-1002 MHz downstream frequency band) are passed to the first subscriber-side port 124 and onto a downstream communications path 130 through the RF signal amplifier 100. Upstream signals that are transmitted over a first upstream communications path 140 are received at the second subscriber-side port 126 and passed through the triplexer 120 where they exit the network-side port 122 and are passed to the RF input port 110. Upstream signals that are transmitted over a second upstream communications path 150 are received at the third subscriber-side port 128 and passed through the triplexer 120 where they exit the network-side port 122 and are passed to the RF input port 110. The first upstream communications path 140 may be configured to carry signals in a first upstream frequency band that includes a contiguous block of frequencies that are lower than the frequencies of the downstream frequency band. The second upstream communications path 150 may be configured to carry signals in a second upstream frequency band that includes a contiguous block of frequencies that are different than the frequencies of the first upstream frequency band and that are also lower than the frequencies of the downstream frequency band.

As is further shown in FIG. 2, the RF signal amplifier 100 further includes a second triplexer 160. The second triplexer 160 includes a subscriber-side port 162 that is coupled to a power divider network 170 and first, second and third network-side ports 164, 166, 168. The triplexer 160 is configured to receive signals that are passed over the downstream frequency band at the first network-side port 164 and pass these signals to the subscriber-side port 162. The triplexer 160 is further configured to filter upstream signals (e.g., signals within the 5-85 MHz upstream frequency band) that are received at subscriber-side port 162 from the power divider network 170 so that upstream signals that are within a first upstream frequency band (e.g., the 5-42 MHz frequency band) are passed to a second network-side port 166 of the triplexer 160 for transmission over the first upstream communications path 140, while upstream signals that are within a second upstream frequency band (e.g., the 50-85 MHz frequency band) are passed to a third network-side port 168 of the triplexer 160 for transmission over the second upstream communications path 150.

As is further shown in FIG. 2, the downstream communications path 130 includes a downstream power amplifier 132, the first upstream communications path 140 includes a first upstream power amplifier 142, and the second upstream communications path 150 includes a second upstream power amplifier 152. The power amplifiers 132, 142 and 152 may have the same or different gains. For example, in some embodiments, power amplifier 132 may have about 18 dB gain, while power amplifiers 142 and 152 may have about 10 dB gain. In some embodiments, the first upstream power amplifier 142 and the second upstream power amplifier 152 may be substantially similar amplifiers. For example, both power amplifiers 142, 152 may have substantially the same operating range such as, for example, an operating range of 0-100 MHz. Both power amplifiers 142, 152 may likewise have the same gain. In some embodiments, the same model of power amplifier may be used to implement both the first upstream power amplifier 142 and the second upstream power amplifier 152, and these power amplifiers may be interchangeable. The first upstream power amplifier 142 and the second upstream power amplifier 152 may each comprise an integrated circuit chip that may, for example, be mounted on a printed circuit board within a housing of the RF signal amplifier 100. These integrated circuit chips may be separated from one another to facilitate the dissipation of heat from the RF signal amplifier 100. In some embodiments, the first upstream power amplifier 142 and the second upstream power amplifier 152 may be implemented using any one of a number of power amplifiers that are currently used to amplify the 5-42 MHz upstream communications path in conventional cable television network RF signal amplifiers. While the particular embodiment illustrated in FIG. 2 includes first and second upstream power amplifiers 142 and 152, it will be appreciated that in other embodiments either one or both of these upstream power amplifiers 142, 152 may be omitted.

Figure 3:
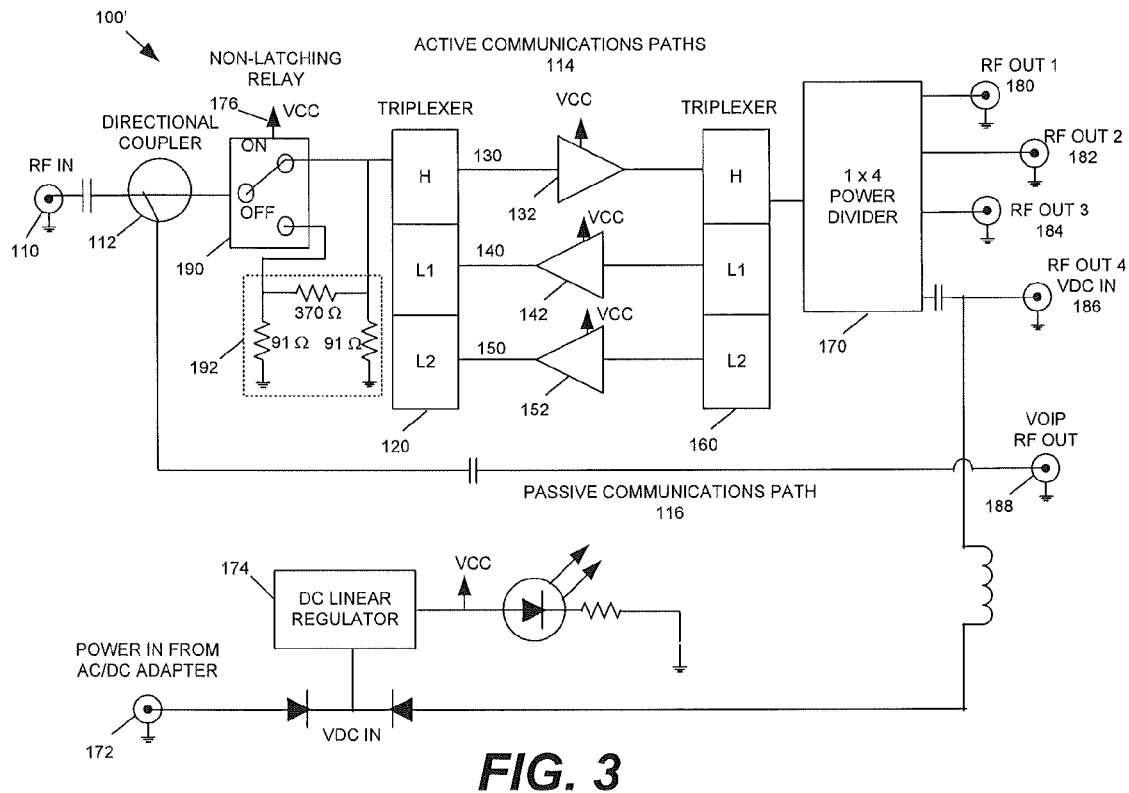
FIG. 3 is a block diagram of a bi-directional RF signal amplifier that includes a self-terminating active communications path according to further embodiments of the present invention.

FIG. 3 is a schematic block diagram of an RF signal amplifier 100' according to further embodiments of the present invention. As is readily apparent from the figures, the RF signal amplifier 100' is very similar to the RF signal amplifier 100 of FIG. 2 that is described above. However, the RF signal amplifier 100' further includes (1) a passive communications path that may be used to provide a non-interruptible communications path for subscriber premises that use VoIP Internet telephone service. Such non-interruptible service is necessary to ensure that acceptable performance for 911 Internet telephone service is achieved when power to the RF signal amplifier 100' is interrupted due, for example, to a power outage (since the power amplifiers 132, 142 and 152 of RF signal amplifier 100' are active devices that cease to operate if the power supply to the RF signal amplifier 100' is interrupted).

Turning to FIG. 3, it can be seen that the RF signal amplifier 100' includes an RF input 110, RF outputs 180, 182, 184, 186, first and second triplexers 120, 160, a downstream communications path 130, first and second upstream communications path 140, 150, a downstream power amplifier 132, first and second upstream power amplifiers 142, 152, and a power divider network 170. As these components have already been described with reference to the RF signal amplifier 100 of FIG. 2, further description of these components will be omitted.

As is further shown in FIG. 3, the RF signal amplifier 100' also includes a passive directional coupler 112 that is used to split signals received at the RF input 110 onto both a set of active communications paths 114 (which include the downstream communications path 130 and the first and second upstream communications paths 140, 150) and a passive VoIP path 116. The directional coupler 112 also combines upstream signals from the subscriber premise 50 (see FIG. 1) that are carried on the active and passive communications paths 114, 116 and couples the combined upstream signal to the RF input 110. It will be appreciated that the directional coupler 112 may either evenly or unevenly split the power of the input signals between the active and passive communications paths 114, 116, depending on the design of the directional coupler 112. The RF output 188 of the passive VoIP path 116 may be connected to a cable modem or other device that provides VoIP internet telephone service. This device may have, for example, a non-latching relay therein that switches to, for example, an attenuator 192 to preserve the impedance of the output of directional coupler 112 that is coupled to the passive VoIP communications path 116 when power is lost. The attenuator 192 may reduce or prevent the potentially poor impedance match that may arise in the case of such a power outage on the other output of the directional coupler 112 (that is coupled to the active communications path 114) from degrading the passive communications path 116 during such power outages. Consequently, the RF signal amplifier 110' may provide a communications path from the subscriber premise 50 (see FIG. 1) to the headend facilities 20 that can support 911 telephone service even if power to the RF signal amplifier 110' is lost.

In particular, as is shown in FIG. 3, the active communications path 114 includes a switching device 190, which may be implemented, for example, as an SPDT non-latching relay. The signals output to the active communications path 114 by the directional coupler 112 are received at an input to the SPDT non-latching relay 190. When the non-latching relay 190 is in the "ON" or "SET" state, these signals then pass to the triplexes 120 and onto the downstream communications path 130 where they may be amplified and passed to the subscriber premise 50 via the power divider network 170 and RF outputs 180, 182, 184, 186.

If the power supply to the RF signal amplifier 100' is interrupted, the power amplifiers 132, 142 and 152 will cease to operate, and the active communications paths 114 through the RF signal amplifier 100' will simulate an open and/or a non-terminated condition. When this occurs, the output of the directional coupler 112 that connects to the active communications paths 114 will appear unterminated, which negatively impacts the return loss of the directional coupler 112. This change in return loss can significantly degrade the performance on the passive communications path 116. As the passive communications path 116 generally has reduced performance anyway (as this path is not amplified), it may be difficult to guarantee acceptable performance for 911 Internet telephone service when power to an RF signal amplifier is interrupted such that the directional coupler 112 that splits signal energy between the active and passive communications paths 114, 116 has an unterminated output. As discussed below, the relay 190 and the attenuator 192 may be used to properly terminate the output of directional coupler 112 that is connected to the active communications path 114 during power outages in order to reduce or prevent any further degradation of the passive communications path 116.

In particular, during normal operation, the RF signal amplifier 100' can be powered from a power input port 172 and/or power that is reverse fed through one of the RF output ports (e.g., RF output port 186). In a typical installation at a subscriber premise 50, the RF signal amplifier 100' may be powered by an AC/DC adapter that receives AC power from the residence (for example, 100-230 VAC, 50/60 Hz). As illustrated in FIG. 3, the power received from either power input can be provided to a voltage regulator 174 which supplies an operating voltage VCC to the power amplifiers 132, 142 and 152.

If the supply of power to voltage regulator 174 is interrupted, voltage regulator 174 will be unable to provide the operating voltage VCC to the power amplifiers 132, 142 and 152. As noted above, when this occurs, power amplifiers 132, 142 and 152 will cease to operate, and signals may no longer traverse the downstream or upstream segments of the active communications path 114. As is also illustrated in FIG. 3, amplifier 100' provides a VCC path 176 to the relay 190. When power (i.e., VCC) to the relay 190 is interrupted, the relay 190 automatically switches from the normal signal path in the "ON" (or "SET") position, to the "OFF" (or "RESET") position (or vice versa when power is resumed). The second output port of relay 190 (the "OFF" port) is connected to an attenuator 192. The attenuator 192 may match the impedance of the active communications path to a desired level (e.g., 75 ohms). As shown in FIG. 3, in one embodiment, the attenuator 192 may be implemented as a 370 ohm resistor that is connected between the second ("OFF") output port of relay 190 and the input of triplexes 120, along with two shunt 91 ohm resistors that are coupled to ground. Such an embodiment will provide approximately 20 dB of attenuation while providing a satisfactory impedance match. It will be appreciated that other attenuator designs that provide different degrees of attenuation may be provided (e.g., a 15 db attenuator, a 10 dB attenuator, a 6 dB attenuator, etc.). When the power supply is interrupted, the relay 190 senses the interruption and switches from the "ON" position to the "OFF" position. As the OFF position of relay 190 is coupled to the attenuator 192, both outputs of the directional coupler 112 are matched. As such, signal degradation due to reflections and the like can be reduced or minimized in order to provide acceptable signal quality on the passive (non-interruptible) communications path 116. A communication device in communication with output port 188 (such as a VoIP compatible device, or other device) can further be provided with backup battery power to maintain the operation of the device during power outages. It will be appreciated that in other embodiments the attenuator 192 may be replaced with a matched resistive termination (e.g., a 75 ohm resistor) that is coupled to ground.

As should be clear from the above description, the amplifier 100' of FIG. 3 includes a selective termination circuit that is configured to pass signals between a cable television network 10 and a subscriber premise 50 over an active communication path 114 when electrical power is received at the power input 172, and is further configured to match the impedance of the active communications path 114 to a desired level when an electrical power feed to the power input 172 is interrupted.

Figure 4:
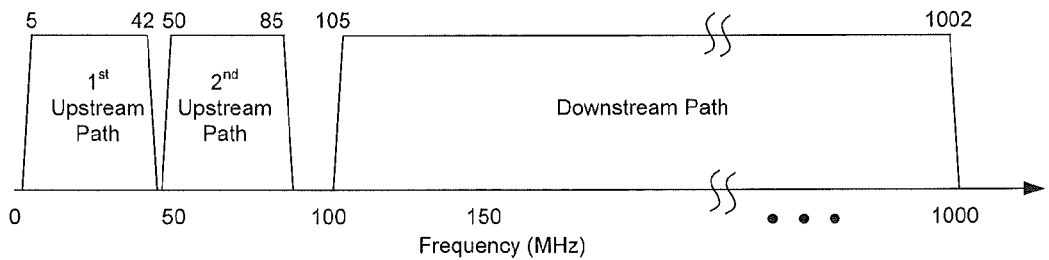
FIG. 4 is a schematic graph illustrating an exemplary downstream communications path and exemplary first and second upstream communications paths that may be supported by RF signal amplifiers according to certain embodiments of the present invention.

FIG. 4 is a graph that illustrates the frequency bands associated with the downstream communications path, the first upstream communications path and the second upstream communications path that may be provided in RF signal amplifiers according to exemplary embodiments of the present invention. As shown in FIG. 4, the downstream communications path 130 may extend from approximately 105 MHz to approximately 1002 MHz. The first upstream communications path 140 may extend from approximately 5 MHz to approximately 42 MHz. The second upstream communications path 150 may extend from approximately 50 MHz to approximately 85 MHz. A first guard band that extends from approximately 42 MHz to approximately 50 MHz may be provided between the first and second upstream communications paths 140, 150 and a second guard band that extends from approximately 85 MHz to approximately 105 MHz may be provided between the second upstream communications path 150 and the downstream communications path 130. It will be appreciated that the frequency ranges shown in FIG. 4 are exemplary in nature, and that numerous other sets of frequency ranges could be used.

Currently, upstream signals are transmitted on most cable television networks using the DOCSIS 3.0 channel format. Each DOCSIS channel uses 6 MHz of bandwidth. As is known to those of skill in the art, in many CATV networks, the 5 MHz to 10 MHz frequency range or even the 5 MHz to 15 MHz frequency range may not be usable due to noise from the power grid and other low frequency disturbances that reduce the signal-to-noise ratio for signals carried in these frequency ranges to an unacceptable level. Consequently, in many applications, the first upstream communications path may effectively have a bandwidth of about 15 MHz to about 42 MHz, which is a 27 MHz band. DOCSIS 3.0 requires 4 carriers at 6 MHz each (or a total of 24 MHz). Thus, the first upstream communications path may support DOCSIS 3.0, even in CATV networks where the 5-15 MHz frequency band is unusable due to low frequency noise. The second upstream communications path has 35 MHz of bandwidth, and hence may support five 6 MHz channels. As noted above, in some embodiments, the second upstream communications path may alternatively be used to support signals having a different modulation format such as, for example, E-PON-Over-Coaxial ("EPOC") signals.

It will be appreciated that the RF signal amplifiers according to certain embodiments of the present invention require two separate power amplifiers, which may increase the power consumption and/or the cost of the device. However, as discussed above, using a higher performance power amplifier instead of the two power amplifier approach discussed herein may have its own disadvantages in terms of cost, power consumption, distortion levels and the like. Moreover, while the RF signal amplifiers according to embodiments of the present invention may allocate more frequencies to guard bands (e.g., the 42-50 MHz guard band in the example of FIG. 4), these RF signal amplifiers may still support significant upstream communications path traffic and may do so using inexpensive, off-the-shelf power amplifiers that have already been demonstrated to have good performance.

Figure 5:
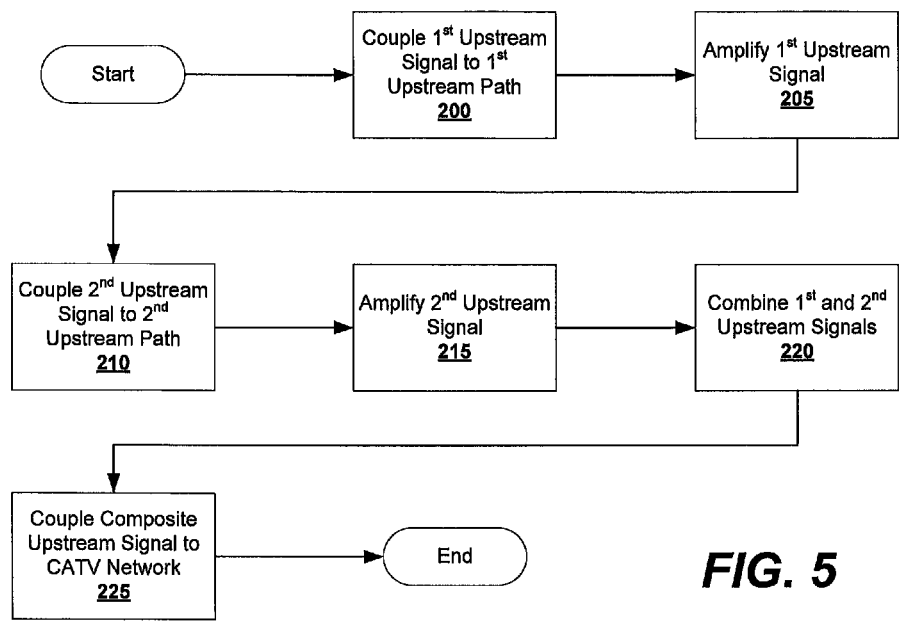
FIG. 5 is a flow chart illustrating methods of transmitting signals from a subscriber premise to a cable television network via an RF signal amplifier according to embodiments of the present invention.

FIG. 5 is a flow chart illustrating methods of transmitting signals from a subscriber premise to a cable television network via an RF signal amplifier according to embodiments of the present invention. As shown in FIG. 5, operations may begin with a first upstream signal being coupled from the subscriber premise to a first upstream communications path of the RF signal amplifier based on a center frequency of the first upstream signal (block 200). For instance, for RF signal amplifiers that have the upstream communications path design shown in FIG. 4, if the first upstream signal has a center frequency in the 5-42 MHz range it will be coupled to the first upstream communications path. This first upstream signal may then be amplified by a power amplifier that is included on the first upstream communications path (block 205). Next, a second upstream signal is coupled from the subscriber premise to a second upstream communications path of the RF signal amplifier based on a center frequency of the second upstream signal (block 210). Again, for RF signal amplifiers that have the upstream communications path design shown in FIG. 4, the second upstream signal will be coupled to the second upstream communications path if it has a center frequency in the 50-85 MHz range. This second upstream signal may then be amplified by a power amplifier that is included on the second upstream communications path (block 215). The first and second upstream signals may then be combined after amplification (block 220) and coupled to the CATV network (block 225).

It will be appreciated that numerous modifications may be made to the above-described exemplary embodiments of the present invention without departing from the scope of the present invention. By way of example, while the RF signal amplifiers that are described above include two upstream communications paths, in other embodiments, more than two upstream communications paths may be provided. For example, RF signal amplifiers could be provided that included three, four, five or six separate upstream communications paths. In such embodiments, cascaded diplexers and/or triplexers may be used in place of, for example, the triplexers 120 and 160 in the embodiments of FIGS. 2 and 3 above to separate the signals onto the appropriate upstream communications paths and to recombine the signals from the upstream communications paths. All of these upstream communications paths may include power amplifiers or, alternatively, power amplifier(s) may be omitted from one or more of the upstream communications paths in these embodiments.

Figure 6:
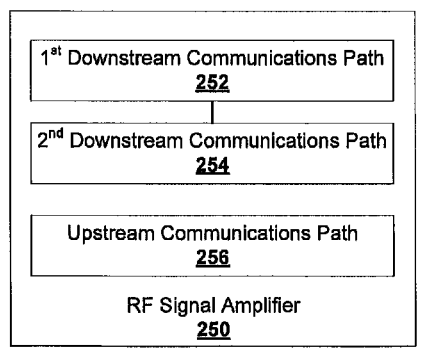
FIG. 6 is a greatly simplified schematic block diagram of an RF signal amplifier according to still further embodiments of the present invention.

As another example, while the above-described embodiments of the present invention include two upstream communications paths, it will be appreciated that similar techniques may be used on the downstream communications path. By way of example, FIG. 6 is a schematic block diagram of an RF signal amplifier 250 according to further embodiments of the present invention that includes first and second downstream communications paths 252, 254 and a single upstream communications path 256 (although additional upstream communications paths could be provided in other embodiments). In the exemplary embodiment illustrated in FIG. 6, the first downstream communications path 252 may be an amplified path that carries downstream signals in the frequency range of approximately 105 MHz to approximately 500 MHz. The second downstream communications path 254 may be an amplified path that carries downstream signals in the frequency range of approximately 550 MHz to approximately 1002 MHz. Thus, it will be appreciated that the concepts of the present invention are not limited to providing multiple upstream communications paths.

It will also be noted that reference is made above to "input" and "output" ports on various components such as ports 110, 180, 182, 184, 186, 188. The network-side and subscriber-side ports on triplexers 120, 160 may similarly be viewed as "input" or "output" ports. It will be appreciated that these ports typically pass signals in both the downstream and upstream directions, and hence the labels "input" and "output" are arbitrary labels, since a port that operates as an "input" port for downstream signals will necessarily operate as an "output" port for upstream signals. Thus, it will be understood that the labels "input" and "output" are used to help to distinguish one port from another port in the description and appended claims, but otherwise are not intended to be limiting in view of the bi-directional nature of the signal flow through the RF signal amplifiers according to embodiments of the present invention.

It will also be appreciated that the "triplexers" that are referred to above encompass not only integrated circuit chip triplexers, but further encompass other circuitry that carries out the operations of the triplexers according to embodiments of the present invention such as, for example, cascaded diplexers or other filter circuits.

The present invention have been described above with reference to the accompanying drawings, in which certain embodiments of the invention are shown. It will be appreciated, however, that this invention may be embodied in many different forms and should not be construed as limited to the embodiments set forth above. Rather, these embodiments are provided so that this disclosure will be thorough and complete, and will fully convey the scope of the invention to those skilled in the art.

It will be understood that, although the terms first, second, etc. are used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", etc.).

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. For example, any number of RF output ports may be supported by the various amplifier embodiments discussed herein.

That which is claimed is:

1. A radio frequency ("RF") signal amplifier for an individual subscriber premises, said RF signal amplifier comprising:
   a first RF output port for connection to a first subscriber device at the subscriber premises;
   a signal separator within said RF signal amplifier connected to said first RF output port, said signal separator receiving upstream RF signals from the first subscriber device via said first RF output port, where the first subscriber device's upstream RF signals reside within the frequency range of 5 MHz to 85 MHz, said signal separator sending a first upstream frequency band of the device's upstream RF signals to a first upstream communication path leading away from said signal separator and sending a second upstream frequency band of the device's upstream RF signals to a second upstream communication path leading away from said signal separator, and wherein the first upstream frequency band and the second upstream frequency band are each within different portions of the frequency range of 5 MHz to 85 MHz;
   a first upstream power amplifier that is configured to amplify signals traversing said first upstream communications path;
   a second upstream power amplifier that is configured to amplify signals traversing said second upstream communications path;
   a signal combiner, wherein said signal combiner accepts output signals from said first and second upstream power amplifiers and forms a combined upstream RF signal residing within the frequency range of 5 to 85 MHz; and
   an RF input port of said RF signal amplifier for receiving the combined upstream RF signal, said RF input port configured for connection to a network tap unit proximate the subscriber premises, so that the combined upstream RF signal may be sent toward headend facilities of a network.

2. The RF signal amplifier of claim 1, wherein said first and second upstream power amplifiers are substantially identical to each other.

3. The RF signal amplifier of claim 1, wherein the first upstream frequency band extends from 5 MHz to 42 MHz and the second frequency band extends from 50 MHz to 85 MHz.

4. The RF signal amplifier of claim 1, wherein said first upstream power amplifier and said second upstream power amplifier each have an operating range that extends across the entire first upstream frequency band and the entire second upstream frequency band.

5. The RF signal amplifier of claim 1, further comprising: second, third and fourth RF output ports; and a power divider network that is coupled between said signal separator and said first, second, third and fourth RF output ports.

6. The RF signal amplifier of claim 1, wherein said first upstream communications path is configured to pass signals having a first modulation format and said second upstream communications path is configured to pass signals having a second modulation format that is different from the first modulation format.

7. The RF signal amplifier of claim 1, wherein an operating bandwidth of said first upstream power amplifier extends across both the first upstream frequency band and the second upstream frequency band.

8. The RF signal amplifier of claim 1, wherein said first upstream power amplifier and second upstream power amplifier have the same operating range of frequencies, and are implemented as separate integrated circuit chips within a housing of said RF signal amplifier.

9. The RF signal amplifier of claim 8, wherein the first upstream communications path is configured to pass signals having a first modulation format and the second upstream communications path is configured to pass signals having a second modulation format that is different from the first modulation format.

10. The RF signal amplifier of claim 1, further comprising: the first subscriber device connected to said first RF output port, and wherein said first subscriber device is an Internet phone, a cable TV, or a cable modem.

11. The RF signal amplifier of claim 1, further comprising: a downstream communications path that is coupled between said RF input port and said first RF output port, said downstream communications path being configured to pass signals in a downstream frequency band located within the frequency range of 105 MHz to 1002 MHz; and a downstream power amplifier that is configured to amplify signals traversing said downstream communication path.

12. The RF signal amplifier of claim 11, wherein said signal combiner is a first triplexer and said signal separator is a second triplexer, and wherein said downstream communications path passes through said first and second triplexers.

13. The RF signal amplifier of claim 12, wherein said first triplexer has an input that is coupled to said RF input port, a first output that is coupled to an input of said downstream power amplifier, a second output that is coupled to an output of said first upstream power amplifier, and a third output that is coupled to an output of said second upstream power amplifier.

14. The RF signal amplifier of claim 13, wherein said second triplexer has an input that is coupled to said first RF output port, an first output that is coupled to an output of said downstream power amplifier, a second output that is coupled to an input of said first upstream power amplifier, and a third input that is coupled to an input of said second upstream power amplifier.

15. The RF signal amplifier of claim 1, wherein the second upstream frequency band extends from 50 MHz to 85 MHz.

16. The RF signal amplifier of claim 1, wherein the first upstream frequency band extends from 5 MHz to 42 MHz.

17. The RF signal amplifier of claim 1, further comprising a guard band provided between the first upstream frequency band and the second upstream frequency band, such that the recombined upstream RF signal does not include frequencies within the guard band.

* * * * *